United States Patent [19]
Myers

[11] 3,810,679
[45] May 14, 1974

[54] NONROTATABLE HUB AND SEAL MEANS FOR AUTOMOTIVE VEHICLE

[76] Inventor: Robert C. Myers, P. O. Box 1981, Scottsdale, Ariz. 85252

[22] Filed: Aug. 14, 1972

[21] Appl. No.: 280,274

[52] U.S. Cl. ........ 301/108 SC, 40/129 B, 301/37 N
[51] Int. Cl. ............................................. B60b 27/06
[58] Field of Search ........... 301/37 N, 105 R, 108 S, 301/108 SC, 124 R, 124 H; 40/129 B; 180/1 H; 403/307, 343

[56] References Cited
UNITED STATES PATENTS

| | | | |
|---|---|---|---|
| 3,495,347 | 2/1970 | Sims | 40/129 B |
| 2,090,123 | 8/1937 | Hoffman | 301/124 R |
| 1,699,831 | 1/1929 | Braucher | 40/129 B |
| 2,707,131 | 4/1955 | Sundberg | 40/129 B |

*Primary Examiner*—Richard J. Johnson
*Assistant Examiner*—Reinhard J. Eisenzopf
*Attorney, Agent, or Firm*—H. Gordon Shields

[57] ABSTRACT

Apparatus is disclosed which includes a nonrotatable hub and means for sealing the nonrotable hub to exclude dust and the like.

6 Claims, 5 Drawing Figures

PATENTED MAY 14 1974  3,810,679

NONROTATABLE HUB AND SEAL MEANS FOR AUTOMOTIVE VEHICLE

BACKGROUND OF THE INVENTION

1. Field of the Invention

This invention pertains to automotive vehicles, and more particularly, to nonrotatable hubs and means for sealing the nonrotatable hubs and front wheel bearings against the intrusion of dust and the like.

2. Description of the Prior Art

Numerous attempts have been made in the prior art to provide nonrotatable hubs for automotive vehicles. While a number of reasonably practical nonrotatable hubs have been suggested, none of the hubs have included means which were effective to seal the wheel bearings of the vehicle against the intrusion of dust and dirt. As is well known, the front wheels of automotive vehicles, except those with front wheel drive, include a nonrotatable spindle on which the front wheel is journalled for rotation on bearing apparatus. Since the wheel rotates on the spindle, a dust cover or dust cap is secured to the wheel and it covers the nonrotatable spindle. The purpose of the dust cover, of course, is to exclude dust and dirt from entering, and mixing with, the front wheel bearing grease and from thence causing unnecessary and undue wear on the bearing apparatus. Since the dust cover is secured to the wheel, it rotates therewith and forms a protective cover or cap for the end or hub of the wheel spindle.

If a nonrotatable hub is secured to the end of the front wheel spindle or axle, it is obvious that there will be a surface which is moving, the surface secured to the wheel, and a surface which is nonmoving or nonrotatable, that which is secured to the spindle. The interface between the moving and nonmoving surface is the location at which appropriate seal means must exist to prevent the problem of dust and dirt contaminating the wheel bearings.

SUMMARY OF THE INVENTION

Nonrotatable hub means are disclosed which include means for affixing the nonrotatable hub to the castle nut presently used in the automobile industry to secure the wheel and bearing means to the nonrotating spindle or axle, and to use a seal between an extension of the castle headed nut and a dust cover which includes an aperture through which the extension extends.

Among the objects of the present invention are the following:

to provide new and useful nonrotatable hub apparatus;

to provide new and useful sealing means with nonrotatable hub apparatus;

to provide new and useful nonrotatable hub and seal means for use with automotive vehicles; and to provide new and useful seal means between a rotating surface and a nonrotating surface.

DESCRIPTION OF THE PREFERRED EMBODIMENT

Figure 1:
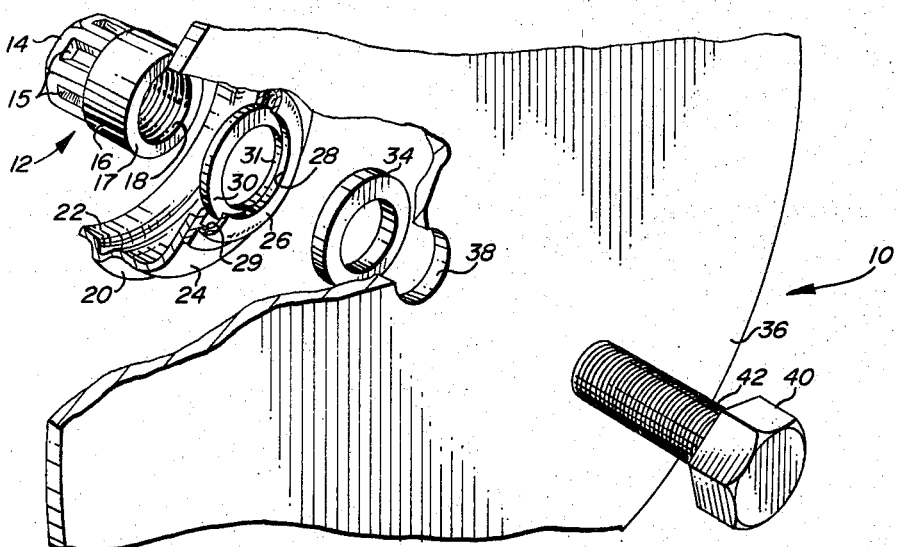
FIG. 1 is a partially broken away exploded view of the apparatus of the present invention.

FIG. 1 is an exploded view, with some components cut away or fragmented, of the apparatus of the present invention. Nonrotatable hub 10 includes an elongated nut 12, which includes a castellated or slotted portion 14 and a circular cylindrical portion 16. The slotted portion of the nut includes a plurality of slots 15 extending circumferentially about the periphery of the nut with each of the slots being oriented axially of the nut. The nut is internally threaded as at 18. As is well known in the automotive art, a castle headed or slotted nut is used to secure a front wheel hub or assembly to the front wheel spindle or axle. The front wheel bearing apparatus is rotatably secured to the front wheel spindle and held in place thereon by a castle headed or slotted nut. The front wheel spindle includes a diametrically extending aperture or keyway, and a pair of slots in the nut are lined up with such aperture and a cotter pin, or the like, is extended through the aligned slot and aperture to prevent the nut from moving relative to the spindle.

In the present invention, the nut is elongated and it includes a circular cylindrical portion 16 to which the nonrotatable hub portion is secured. A diametrical pair of slots 15 of the elongated nut receive a cotter pin, or the like, when the nut is secured to a spindle, to prevent the nut from moving on the spindle. The circular portion 16 extends well beyond the end of the front wheel spindle.

With a front wheel in place on the spindle, neither of which is illustrated in FIG. 1 but is well known and typical in the art, a dust cover 20 is inserted about the elongated nut and serves to prevent dust and dirt from contaminating the front wheel bearings. Dust cover 20 includes an open portion or mouth 22, which, as is typical, mates with the front wheel assembly concentrically about the nut 12 on the front wheel spindle. The dust cover 20 also includes a dome portion 24 into which the nut 12 and a spindle extend. A seal retainer 26 includes an aperture 28 and a groove 29. The groove 29 receives a seal 30.

The cylindrical portion 16 of the elongated nut 12 extends through the aperture 28 and the inner periphery 31 of the seal 30. The seal 30 is retained by the seal retainer 26 about the aperture 28 of the dust cover 20. Thus the seal 30 prevents dust, dirt, and the like from entering into the dust cover 20 and from there contaminating the front wheel bearings.

The elongated nut 12 thus extends through dust cover 20 and through the seal 30. The elongated nut 12 includes a face portion 17 which is perpendicular to the axis of the nut and adjacent the circular cylindrical portion 16. The face portion extends through and beyond the dust cover 20.

A flat washer 34 is disposed between the elongated nut 12 and a wheel cover 36. The wheel cover 36 includes an aperture 38 which extends therethrough coaxially with washer 34 and with the elongated nut 12. The washer 34 is disposed between face 17 of the nut and wheel cover 36. The wheel cover is held in place against the washer 34 and the nut 12 by a bolt 40. The bolt 40 includes a threaded portion 42 which extends through aperture 38 of wheel cover 36, through washer 34 and into the threaded portion 18 of elongated nut 12. The nonrotatable hub apparatus 10 is thus held in place against the front wheel assembly of an automobile and the front wheel is effectively sealed against the intrusion of dust, dirt, and other contaminants. The wheel cover is shown in a flat or planar disc configuration, but other configurations, such as convex or concave, could be used.

Figure 2:
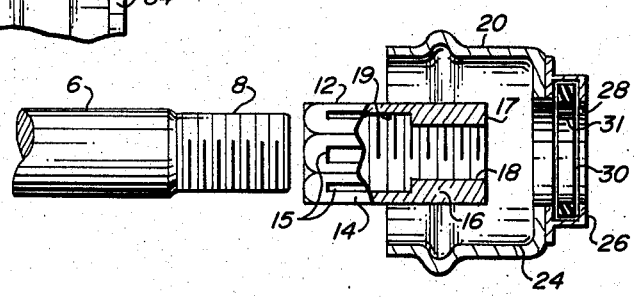
FIG. 2 is an exploded view in partial section of the apparatus of FIG. 1.

FIG. 2 is an exploded sectional view of the apparatus of FIG. 1. An automobile front wheel spindle 6, with a threaded portion 8, is shown adjacent the nonrotatable hub apparatus 10. Elongated nut 12, with its castellated or slotted portion 14 and its cylindrical portion 16 is shown adjacent the spindle 6. The elongated nut includes a plurality of slots 15, a diametral pair of which mate with an aperture (not shown) which extends diametrically through the threaded portion 8 of spindle 6. With a wheel assembly in place on spindle 6, the elongated nut 12 is secured to the threaded portion 8 of the spindle to hold the wheel assembly, which includes appropriate wheel bearings, onto the spindle. The elongated nut 12 includes internal threads 19, which are of a larger diameter than are the internal threads 18, and the threads 19 mate with the threads 8 of the spindle 6.

With the elongated nut 12 in place on the spindle, the dust cover 20 is then placed over the elongated nut and serves to protect the wheel bearings of the wheel assembly. The cylindrical portion 16 of the elongated nut 12 extends through aperture 28 in the dome portion 24 of the dust cover, with the face 17 of the nut 12 projecting a sufficient distance beyond the dust cover to prevent interference between the rotation of the dust cover 20, as it moves with the wheel, and the elongated nut 12 which is nonrotatable with the hub assembly.

The dust cover 20 includes a seal retainer 26 which serves to retain a seal 30. The inner periphery 31 of the seal 30 engages the cylindrical portion 16 of the elongated nut 12 and cooperates with the dust cover and the seal retainer thereof to prevent foreign matter, such as dust and dirt, from entering within the dust cover.

Flat washer 34 is disposed between wheel cover 36 and the face 17 of the elongated nut 12. A bolt 40 extends through aperture 38 of the wheel cover, through the washer 34, and the threaded portion 42 of the bolt engages the internal threads 18 of the elongated nut 12. The wheel cover 36 is thus secured in a nonrotatable manner to spindle 6 of the automobile.

Figure 3:
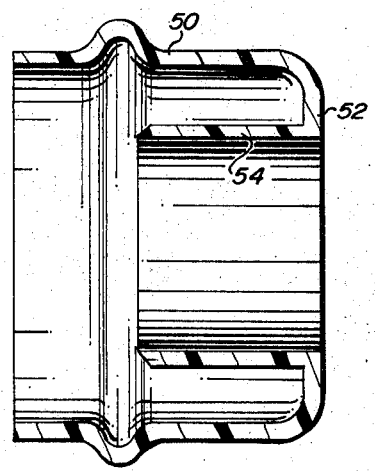
FIG. 3 is a sectional view of an alternate embodiment of part of the apparatus of the present invention.

FIG. 3 comprises an alternate embodiment of a portion of the apparatus of FIGS. 1 and 2. It discloses a dust cap 50 which includes an integral seal. The dust cover 50 includes a dome portion 52 and the dome portion 52 includes an inwardly extending tubular portion 54. The tubular portion 54 extends from the dome 52 inwardly and generally parallel to the axis of the dust cover for a distance which is about half the axial length of the dust cover.

The inside diameter of the tubular portion 54 is substantially the same as the external diameter of the cylindrical portion 16 of the elongated nut 12 which extends through the tubular portion and sealingly engages therewith. Preferably, the tubular portion 54 sealingly mates with the elongated nut 12 over substantially the axial length of the circular portion 16 of the nut.

When using a dust cover, such as disclosed in FIG. 3, which includes an integral seal means, the dust cover should preferably be made of polymerized material which includes self lubricating properties, such as Nylon, polyethylene, polypropylene, or the like.

Figure 4:
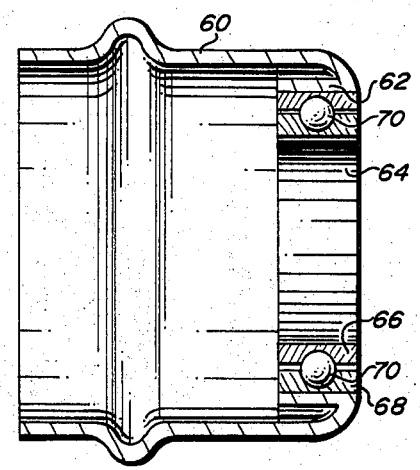
FIG. 4 is a sectional view of another alternate embodiment of a portion of the present invention.

The apparatus of FIG. 4 is an alternate embodiment of a dust cover which includes another type of sealing means. Dust cover 60 is of a configuration similar to that of FIG. 3, in that it includes an inwardly extending portion, but the inwardly extending portion of the dust cover of FIG. 4 does not make contact with an elongated bolt, such as bolt 12 of FIGS. 1 and 2. Dust cover 60 includes an inwardly extending portion 62, generally axially parallel to a front wheel spindle and to a nut, such as nut 12, which extends therethrough. The inwardly extending portion 62 receives seal means 64. Seal means 64 comprises a ball bearing type of seal, including an inner race 66 and an outer race 68 separated by a plurality of ball bearings 70. The outer race 68 is disposed against the interior or inner periphery of the inwardly extending portion 62 of the dust cover. The interior periphery of the inner race 66 matingly engages the exterior periphery of the cylindrical portion 16 of the elongated nut 12. By means of the ball bearings, the outer race 68 rotates with the dust cover 60 as the wheel rotates, while the inner race 66 remains nonrotatable with the spindle and the elongated nut and wheel cover affixed thereto.

Figure 5:
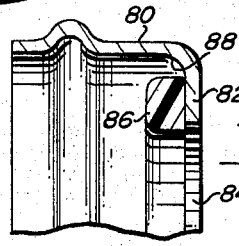
FIG. 5 is a fragmentary sectional view of still another alternate embodiment of a portion of the apparatus of the present invention.

FIG. 5 discloses still another alternate embodiment of seal means for the present invention. Dust cover 80 includes a dome portion 82 with an aperture 84 extending therethrough. A seal 86 is secured to inner wall 88 of the dome 82 of the dust cover circumferentially about the aperture 84. The seal has an inside diameter slightly less than that of aperture 84 and substantially the same as the outer diameter of the circular portion 16 of elongated nut 12 which extends therethrough and to which it sealingly engages. The seal 86 also has an outer diameter greater than that of aperture 84 such as to overlap a portion of the inner wall 88 of the dust cover to which it is secured, as by any well known bonding or adhesive material. The seal 86 thus rotates with the dust cover 80 about the nonrotatable spindle and elongated nut fastened thereto. Preferably, the seal is made of an elastomeric material.

While the principles of the invention have been made clear in an illustrative embodiment, there will be immediately obvious to those skilled in the art many modifications of structure, arrangement, proportions, the elements, materials, and components used in the practice of the invention, and otherwise, which are particularly adapted for specific environments and operating requirements, without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What is claimed is:

1. A nonrotatable hub for a motor vehicle, comprising, in combination:
   a nonrotatable spindle affixed to said automobile, including a threaded portion;
   an elongated nut of substantially constant external diameter, including a castellated portion and a cylindrical portion on the exterior periphery of said elongated nut, having a first internally threaded portion for mating with the threaded portion of said spindle, a second internally threaded portion, said castellated portion overlying the first internally threaded portion, and said cylindrical portion on the exterior periphery of said elongated nut substantially overlying said second internally threaded portion;

a dust cover for sealing the spindle of said automobile, said dust cover including an aperture therein for receiving the cylindrical portion of said elongated nut, seal means circumferentially extending about said aperture for sealingly engaging the cylindrical portion of said elongated nut;

a wheel cover; and means for securing said wheel cover to said elongated nut.

2. The apparatus of claim 1 in which the means for securing the wheel cover to the elongated nut comprises a bolt threadable into the second threaded portion of the elongated nut.

3. The apparatus of claim 2 in which the seal means includes:

a seal retainer disposed adjacent said aperture; and a seal disposed in said seal retainer for sealingly engaging the elongated nut.

4. The apparatus of claim 2 in which the seal means is secured to the dust cover adjacent the aperture therein.

5. The apparatus of claim 2 in which the seal means comprises an inwardly extending tubular portion of said dust cover for sealingly engaging the cylindrical portion of said elongated nut.

6. The apparatus of claim 2 in which the seal means includes:

an inwardly extending portion of said dust cover; and bearing means disposed against said inwardly extending portion of the dust cover including an outer bearing race and an inner bearing race, said inner bearing race engaging the cylindrical portion of said elongated nut.

* * * * *